United States Patent [19]

Tamamura et al.

[11] Patent Number: 4,860,040

[45] Date of Patent: Aug. 22, 1989

[54] CAMERA

[75] Inventors: Hideo Tamamura; Masakazu Taku, both of Kanagawa, Japan

[73] Assignee: Canon Kabushiki Kaisha, Tokyo, Japan

[21] Appl. No.: 207,503

[22] Filed: Jun. 16, 1988

[30] Foreign Application Priority Data

Jun. 19, 1987 [JP] Japan ................................. 62-152908
Jun. 24, 1987 [JP] Japan ................................. 62-157223
Jun. 30, 1987 [JP] Japan ................................. 62-163160

[51] Int. Cl.$^4$ .......................... G03B 3/00; G03B 17/38
[52] U.S. Cl. ................................. 354/170; 354/195.1; 354/212; 354/266; 354/400
[58] Field of Search .................... 354/195.1, 212, 266, 354/170, 171, 173.1, 202, 354, 400, 226

[56] References Cited

U.S. PATENT DOCUMENTS 4,664,493 5/1987 Takagi ................................. 354/226

Primary Examiner—A. A. Mathews
Attorney, Agent, or Firm—Fitzpatrick, Cella, Harper & Scinto

[57] ABSTRACT

A camera uses a shape-memory material featuring the construction and arrangement of the elements of shape-memory material in which different operations of the camera can be made performed by a common member of shape-memory material, or the operation of the camera can be recycled at a high rate as a fan is driven when the film is transported with advantages of improving features of the camera.

20 Claims, 10 Drawing Sheets

CAMERA

BACKGROUND OF THE INVENTION

1. Field of the Invention

This invention relates to cameras and, more particularly, to cameras having a constituent element made of a shape-memory material thermally deformable to restore the memorized shape.

2. Description of the Related Art

Of the shape-memory materials thermally deformable to restore the memorized shape, the shape-memory alloy, when heated by electric current flowing therethrough, can deform (for example, contract) to restore the memorized shape at a very fast speed. In the past, therefore, a wide variety of devices utilizing such a, property have been proposed.

In the application of this shape-memory material to cameras, however, the following drawbacks arise.

(i) The use of a drive source of the shape-memory material instead of an electric motor, though contributing to a simplification of the structure of the camera, if different drive members made of the shape-memory material are used for the focusing and exposure mechanisms, does not always lead to a great advantage of low cost.

(ii) The shape-memory material when heated above the transformation temperature rapidly restores to the memorized shape. But, after the supply of electric current for heating has been cut off, it takes a long time to get to the initial state by plastic deformation under the action of an external force (e.g., a spring or the like). Therefore, the camera cannot recycle the operation in a short time, and a phalographic chance will be missed.

Meanwhile, to improve this drawback, the aforesaid external force, for example, the bias force of a spring, may be very strongly acted on. For this case, however, the increased resistance during the restoring of the memorized shape (by contracting, for example) on heating invites problems of slowing down the contracting speed and decreasing the amount of displacement.

(iii) If the heating of the shape-memory alloy is controlled by the current supply control circuit, the temperature to which it is heated is influenced by the ambient temperature, varying from situation to situation. To make a safe design for the camera employing the shape-memory alloy, its workable conditions must be restricted to a very narrow range.

SUMMARY OF THE INVENTION

With the foregoing in mind, the present invention has been made to provide a camera comprising motion means rotatable in first and second directions and slidingly movable when simultaneously receiving rotative drive forces in the first and second directions, a first shape-memory member for applying to the motion means the rotative drive force in the first direction, a second shape-memory member for applying to the motion means the rotative drive force in the second direction, first actuating means for performing a first operation of the camera in response to the rotation of the motion means by the drive force of the first or second shape-memory member, and second actuating means for performing a second operation of the camera in response to the sliding movement of the motion means by the drive forces of the first and second shape-memory members, wherein the first and second actuating means of the camera are made to be driven by the shape-memory members having a common shape, whereby the amount of shape-memory material used is minimized, and the structure of construction is also simplified, thus being advantageous and allowing for a decrease in cost.

Another object of the invention is to provide a camera having an excellent ability to take snapshots. For this purpose, when the phalosensitive material such as film, is being transported, a fan is driven to rapidly cool down the once heated shape-memory member, whereby the camera is made ready to take the next shot in a short period of time.

Still another object of the invention is to provide a camera comprising means for preventing the shape-memory member from being overheated. This means is also made up of shape-memory alloy, is connected in series to the shape-memory member and is so formed that when supplied with electric current, its deformation to restore starts later than that of the shape-memory member. By this deformation, the current supply to the shape-memory member is cut off. Thus, the shape-memory member is protected against damage by overheating with great effectiveness.

These and other objects of the invention will become apparent from the following description of embodiments thereof.

DETAILED DESCRIPTION OF THE PREFERRED EMBODIMENTS

Figure 1:
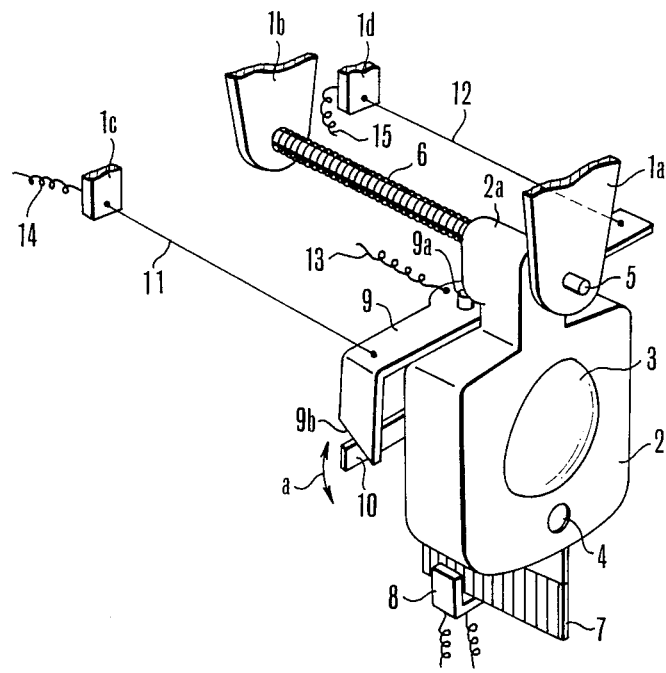
FIG. 1 is a perspective view of the main parts of an embodiment of a camera according to the invention.

The invention is described in connection with embodiments thereof by reference to the drawings. FIG. 1 in perspective view shows the essential constituent parts of a first embodiment of a camera according to the invention.

In FIG. 1, 1a and 1b are a pair of bearings extending from a framework (not shown) of the camera. A lens barrel 2 for a photographic lens 3 has an exposure device including a shutter and a diaphragm incorporated therein and is equipped with a window 4 for a range finder. A guide shaft 5 for the barrel 2 is fixedly mounted at its ends on the bearings 1a and 1b and oriented in parallel with the optical axis of the photographic lens 3. A suspension 2a for the barrel 2 is constructed as a projected portion extending from the upper side of the barrel 2 and has a hole movably fitted on the guide shaft 5. A coil spring 6 is loosely fitted on the shaft 5 and urges the suspension 2a forward (to the right as viewed in the figure). A slit plate 7 is fixedly mounted on the lower side of the barrel 2. A lens barrel movement detector 8 such as photointerrupter is fixedly mounted on the framework of the camera and non-contactly detects, without contacting the amount of movement of the slit plate 7. A rotatable member 9 of electric conductivity is mounted about a vertical pivot pin 9a on a rear end portion of the barrel 2. An operating lever 10 for the exposure device is rotatable in directions indicated by arrow "a" in engagement on a camming surface 9b formed in one end of the rotatable member 9. A first motion generating member 11 made of shape-memory alloy as a shape-memory material capable on heating of restoring the memorized shape is fixedly secured between one end of the rotatable member 9 and a portion 1c of the framework of the camera, and is extending in parallel with the barrel guide shaft 5. A second motion generating member 12 made of shape-memory alloy which is a similar shape-memory material to the first motion generating member 11 is fixedly secured between the other end of the rotatable member 9 and another portion 1d of the framework of the camera and is extending in parallel with the first motion generating member 11. A lead wire 13 is electrically connected through the rotatable member 9 to one end of each of the first and second motion generating members 11 and 12. Another lead wire 14 is connected to the other end of the first motion generating member 11 which is fastened on the framework portion 1c. A third lead wire 15 is connected to the other end of the second motion generating member 12 which is fastened on the framework portion 1d.

Figure 2:
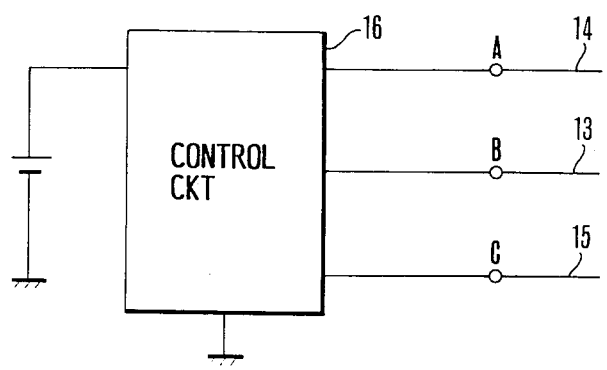
FIG. 2 is a diagram illustrating an electrical arrangement related to the mechanism of FIG. 1.

The opposite ends of these three lead wires 13-15 are connected to respective outlets B, A and C of a control circuit 16 of known structure shown in FIG. 2. Depending on the necessity of moving the lens barrel 2 and the necessity of operating the exposure device, the control circuit 16 selects two of the three outlets to flow current therefrom to the two of the lead wires.

Figure 3:
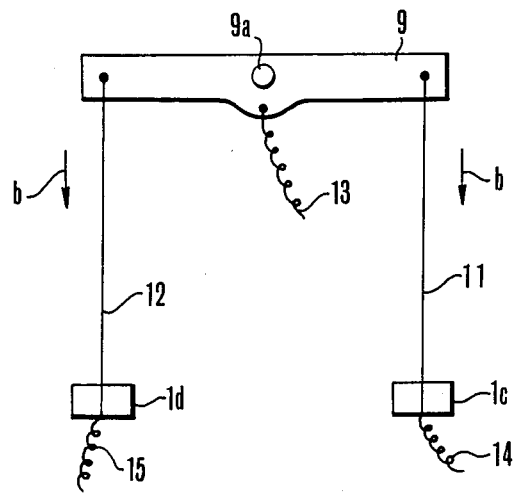
FIGS. 3 and 4 are top views of the main parts of the camera of FIG. 1 in different operative positions.

When shooting an object using camera having the construction and arrangement of the elements shown in FIGS. 1 and 2, the photographer pushes down a release button (not shown), whereby the control circuit 16 is rendered operative. So, the brightness and distance of the object are measured by a light meter (not shown) and a range finder, respectively. On memorization of the measured values of these factors, to move the barrel 2 to the in-focus position corresponding to the measured value of object distance, the control circuit 16 first puts a current flow across the outlets A and C. This current flow goes through the wires 14 and 15 to heat the first and second motion generating members 11 and 12. Thereby, these members contract at the same rate in the direction indicated by arrows "b" to restore the memorized shape, for example, a coil-like shape. Therefore, the rotatable member 9 while remaining in the attitude shown in FIG. 3 is driven to move rearward (leftward in FIG. 1; downward in FIG. 3) in parallel to the optical axis. Hence, the barrel 2, too, is axially moved rearward (leftward in FIG. 1) along with the rotatable member 9, while compressing the spring 6.

During this time, the amount of movement of the barrel 2 is monitored by the detector 8. The detection result is fed back to the control circuit 16 where it is compared with a predetermined amount of movement for focusing determined by the measured object distance. And, when the barrel 2 has arrived at the predetermined focusing position, it is arrested by a barrel stopping device (not shown). Thus, the barrel 2 is set in focus.

Figure 4:
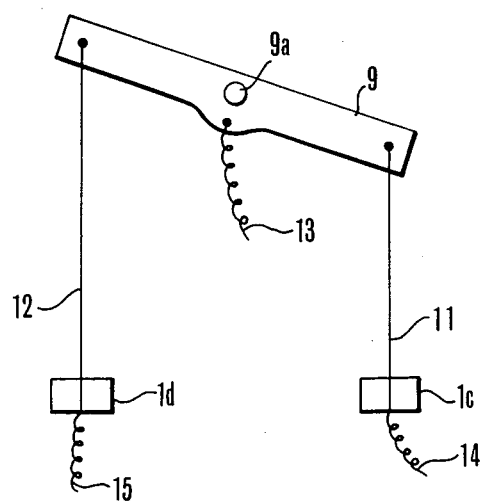

When the stoppage of the barrel 2 is made sure, as sensed from the output signal of the detector 8, the control circuit 16 cuts off the current supply across the outlets A and C, and but instead starts supply of a current across the outlets A and B. Because the current supply to the second motion generating member 12 is cut off, it becomes possible for this member to expand. On the other hand, the first motion generating member 11, because of the continuance of the current supply thereto, further contracts. As a result, the rotatable member 9 is driven to turn about the pivot pin 9a in a clockwise direction as shown in FIG. 4. Such movement of the rotatable member 9 causes counterclockwise movement of the operating lever 10 as viewed in FIG. 1 since the slant camming surface 9b pushes the left end of the lever 10 downward. Hence, the exposure device in the barrel 2 is operated to effect exposure. After the exposure has been completed, the control circuit 16 cuts off the current supply across the outlets A and B. Then, it becomes possible for the first motion generating member 11 to expand. The bias force of a spring (not shown) turns the operating lever 10 while pressing in contact the camming surface 9b until the operating lever 10 regains the initial position. This also causes the rotatable member 9 to return to the initial angular position perpendicular to the optical axis, as the first motion generating member 11 is expanding.

After the exposure device has thus been reset, when the barrel 2 is released from the arresting connection with the barrel stopping device, the barrel 2 is pushed by the resilient force of the spring 6 forward, returning to the initial position.

Figure 5:
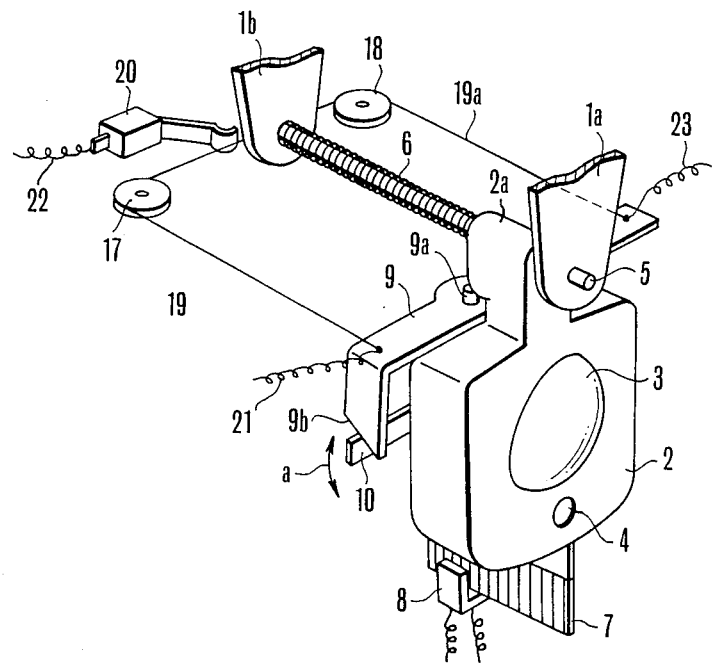
FIG. 5 is similar to FIG. 1 except that an example of partial variation of the camera main parts is illustrated.

FIG. 5 illustrates an example of a variation of the first embodiment of the invention, wherein the parts denoted by the same reference numerals as those in FIG. 1 are similar to those of FIG. 1. Therefore, their explanation is omitted.

In the example of FIG. 5, what is different from the embodiment of FIG. 1 is that the motion generating members on both ends of the rotatable member 9 are constructed in the form of one cable trained round at least one pulley provided on a stationary framework portion of the camera, and of which both ends are connected to both ends of the rotatable member 9.

In FIG. 5, two pulleys 17 and 18 are rotatably mounted on a stationary portion of the camera, such as the framework. A motion generating member 19 in the form of a cable is made of shape-memory alloy as the shape-memory material, of which both ends are connected to both ends of the rotatable member 9 and which is trained round the pulleys 17 and 18. A sliding contact 20 slidingly contacts on the motion generating member 19 at an intermediate point between the pulleys 17 and 18. A lead wire 21 is connected to the motion generating member 19 at the right hand end portion of the rotatable member 9. Another lead wire 22 is connected to the sliding contact 20. Another lead wire 23 is connected to the motion generating member 19 at the left hand end portion of the rotatable member 9.

Figure 6:
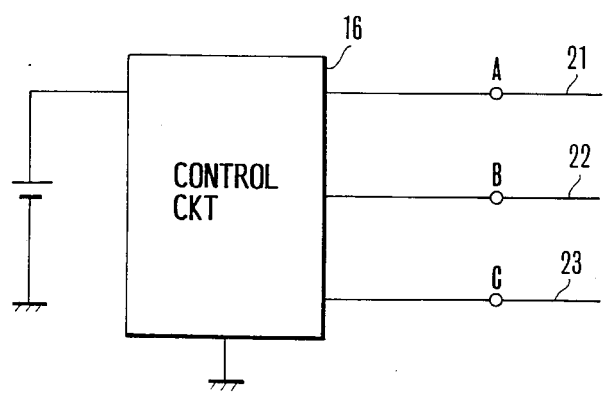
FIG. 6 is a diagram of an electrical arrangement related to the mechanism of FIG. 5.

FIG. 6 shows a similar control circuit 16 to that of FIG. 2 having outlets A to C which are connected to the respective leads wires 21 to 23.

The operation of the camera of FIGS. 5 and 6 is as follows:

When a release button (not shown) is pushed down, the control circuit 16 is rendered operative to carry out light and distance measurements by a light meter and a range finder (not shown), respectively.

Figure 7:
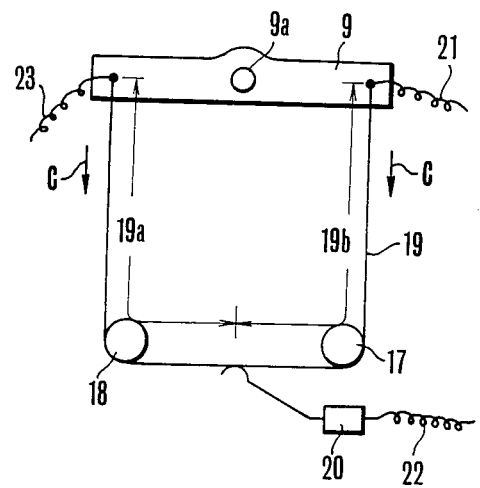
FIGS. 7 and 8 are top views of the main parts of the camera of FIG. 5 in different operative positions.

On memorization of the measured values of the brightness and distance, to move the barrel 2 to an in-focus position corresponding to the measured value of the object distance, the control circuit 16 first supplies current across the outlets A and C so that the current flows through the wires 21 and 23 to the entirety of the motion generating member 19 from one end to the other. Therefore, that member 19 contracts evenly over the entire length thereof, pulling the rotatable member 9 in a direction indicated by arrows "c" in FIG. 7. To move rearward in parallel with the optical axis, the rotatable member 9 and the barrel 2 push the spring 6 to be compressed.

During this time, the amount of movement of the barrel 2 is sensed by the lens barrel movement detector 8. Its detection result is fed back to the control circuit 16 and compared with a predetermined value of focusing movement. And, when the amount of movement of the barrel 2 has reached that value, the barrel stopping device (not shown) arrests the barrel 2. Thus, the barrel 2 is set in the in-focus position.

Figure 8:
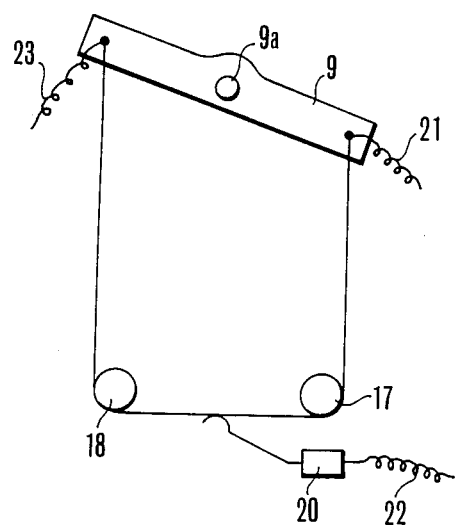

When the stoppage of the barrel 2 is made sure as determined from the output of the detector 8, the control circuit 16 cuts off the current supply across the outlets A and C, and instead starts the current supply across the outlets A and B. Therefore, that part 19a of the motion generating member 19 which lies between the left end of the rotatable member 9 and the sliding contact 20 (or the left half of the member 9) is stopped from heating so that it becomes possible for part 19a to expand. Meanwhile, the other half 19b of the motion generating member 19 further contracts. Hence, the rotatable member 9 is turned about the pivot pin 9a in a clockwise direction as viewed in FIG. 8. As a result, the slanted camming surface 9b formed in one end of the rotatable member 9 turns the operating lever 10 downward in FIG. 5. The exposure device in the barrel 2 is operated by the lever 10 and an exposure is effected. After the termination of the exposure, the control circuit 16 cuts off the current supply across the outlets A and B. Therefore, it is possible for the entirety of the motion generating member 19 to expand. The exposure operating lever 10 is turned clockwise in FIG. 5 by the force of a spring (not shown) until the end of the lever 10 while pressing the camming surface 9b of the rotatable member 9 returns to the initial position of FIG. 5, and then the rotatable member 9 returns to the perpendicular state to the optical axis. The motion generating member 19 also relaxes.

When the barrel 2 is then released from the arresting connection with the barrel stopping device, the barrel 2 is pushed by the resilient force of the spring 6 forward to return to the initial position.

As has been described above, in the camera according to the foregoing embodiment, the drive source for the focusing movement of the barrel and the drive source for operating the exposure device are constructed by a common motion generating member, thereby giving an advantage that it can be manufactured at a far lower cost than the conventional camera of the same kind.

It should be noted that the invention includes a modification of the above-described embodiment such that for operating the rotatable member, the selection of the motion generating member or the portion thereof to be cut off from the current supply is reversed so that the rotatable member turns in the opposite direction to carry out the exposure operation and further other operations.

Figure 9:
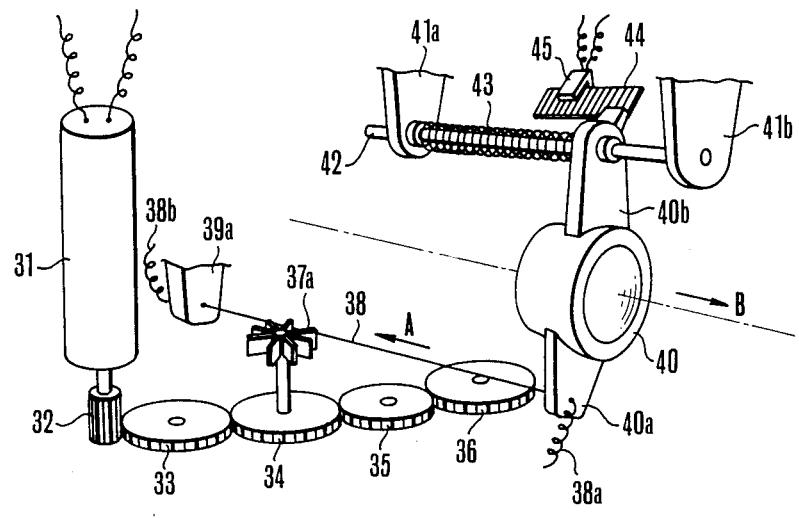
FIG. 9 is a perspective view of another embodiment of the focusing mechanism for a camera according to the invention.
Figure 10:
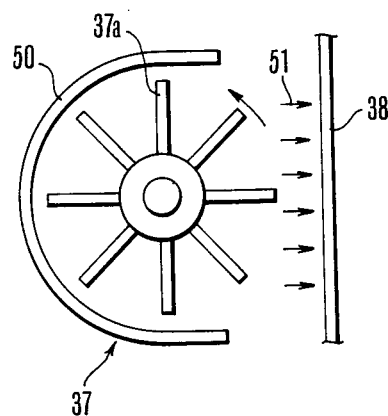
FIG. 10 is a top view of the cooler and the actuator in the form of a wire made of shape-memory alloy in the mechanism of FIG. 9.

Next described is another embodiment of the invention, with reference to FIGS. 9 and 10. An electric motor 31 for winding up film has an output shaft on which a pinion 32 is mounted. Gears 33 to 36 constitute a train for transmitting the torque for winding up film. After the AF device and the shutter (not shown) have completed their operation, the gear train starts to operate, transmitting the torque from the pinion 32 to a windup mechanism (not shown). When the film has been advanced one frame, its motion stops.

A fan 37a is supported on the common shaft of the gear 34. By rotation of this gear 34, the fan 37a, too, rotates to move air. This constitutes a cooling device 37 to be more fully described later.

An actuator 38 in the form of a wire made of shape-memory alloy as the shape-memory material is connected between a stationary portion 39a of the framework of the camera and one armed portion 40a of a lens barrel 40 in a tensioned state, and arranged upon heating to a predetermined temperature to change its shape from the straight line (as deformed by the compression spring force to be more fully described later) to restore a previously memorized shape (in this instance, a coil with shortening of the entire length). Electrical power for heating the actuator 38 is supplied at lead wires 38a and 38b from a control circuit (not shown).

The lens barrel 40 has two armed portions 40a and 40b. Connected to one armed portion 40a is, as has been described above, one end of the wire form of the actuator 38 of the shape-memory alloy. The other armed portion 40b has an axial fitted hole through which a fixed shaft 42 penetrates to support the lens barrel 40 to be slid back and forth along the shaft 42.

The shaft 42 is fixedly mounted between stationary portions 41a and 41b of the framework of the camera. A compression spring 43 in the turned form round the shaft 42 intervenes between the stationary portion 41a and the armed portion 40b of the lens barrel 40, urging the lens barrel 40 always toward the opposite stationary portion 41b.

A slit plate 44 is fixedly carried on the lens barrel 40. A photo-coupler 45 is fixedly mounted on the framework and is arranged so that the slit plate 44 crosses the optical paths of projection and reception of the photo-coupler 45. Therefore, depending on the number of times the slit plate 44 intercepts the optical paths, the amount of movement of the barrel 40 can be determined. For this purpose there is provided a circuit which because of its structure being similar to the known one, is not explained here.

A wall 50 is provided around the fan 37a to increase the efficiency of air blast to the actuator 38. To this purpose, it is desirable that this wall 50 is semi-circular in cross-section with the fan 37a at the center, and its opening is so oriented that the air blows in a direction of arrow 51 to the actuator 38.

The mechanisms of this embodiment operate as follows:

To operate the camera, the photographer pushes a release button (not shown) to a first clicked position (SW1), thereby an AF sensor (not shown) is rendered operative to determine a distance by which the lens barrel 40 is to be moved, producing a focusing signal. Then, the release button is further pushed to a second clicked position (SW2), and thereupon the aforesaid focusing signal commands a current supply to the wire-shaped actuator 38 of shape-memory alloy. The current-fed wire-shaped actuator 38 generates heat. When its temperature exceeds the transformation temperature, it starts to contract to a coil shape. By the contraction of the actuator 38, the lens barrel 40 is moved in a direction indicated by arrow A. Along with the movement of the lens barrel 40, the slit plate 44 moves too. When the lens barrel 40 has moved the distance determined by the AF sensor as detected by the counted number of pulses from the photo-coupler 45, the current supply to the actuator 38 is cut off. This is immediately followed by release of the shutter and the film is exposed.

Responsive to a signal representing the closure of the shutter, detecting means (not shown) starts the motor 31 for winding up the film. At the same time, the cooling fan 37a starts to rotate. Hence, the once heated actuator 38 is being cooled during the time when the film is advanced one frame. Thus, the coil-shaped actuator 38 is rapidly cooled down. As the temperature of the actuator 38 decreases, it gradually expands under the action of the compression spring 43 that urges the lens barrel 40, permitting the lens barrel 40 to move in the direction of arrow B. Since the cooling down is swiftly carried out by a blast of air from the fan 37a, the transition from the coil to the wire shape of the actuator 38 takes place smoothly. The film winding operation is then completed with the barrel 40 in the initial position (shown in FIG. 9) Therefore the, camera is reset and ready to take the next shot.

As has been described above, the AF mechanism-equipped camera of this embodiment has a feature that the cooling of the actuator of shape-memory alloy is sped up by using the fan arranged to rotate when the film is wound up. This enables smooth and swift return of the actuator to the initial state in each shot to be achieved. As compared with the case of using an electric motor solely for the AF mechanism, the mechanism can be constructed in a simple form and at a lower cost. Also, since an electric motor which would otherwise be necessary solely to drive the cooler can be omitted, there is an additional advantage that the aforesaid effects become greater.

It should be noted that, in this embodiment, the aforesaid cooling fan operates with the winding up operation. But, when in application to the camera of the type in which after all of the unexposed film has once been wound up, the exposed frames are rewound, or of the so-called prewinding type, the aforesaid cooling fan should be made to operate with each cycle of the film rewinding operation.

Still another embodiment of the invention is next described by reference to FIG. 11. A camera has a photographic lens 61 in a lens barrel 62 with its armed portion 62b movably fitted on a guide bar 63 to axially move the lens 61 for focusing purposes. A pair of support plates 64 and 65 for the guide bar 63 are in unified form with the framework of the camera. A spring 66 urges the lens barrel 62 axially in a direction of arrow A, and is turned round the guide bar 63.

An electrically conductive drive lever 67 is rotatably mounted on an electrically conductive pivot shaft 68 relative to the framework of the camera, and normally takes the illustrated position. But, when an actuator portion 69a of an actuator 69 connected to a swing arm 67b deforms, its motion is enlarged through another swing arm 67a (the opposite side of the arm 67b) which engages with an arm 62a of the lens barrel 62 and transmitted to the lens barrel 62 so that the lens barrel 62 can move axially in a direction of arrow B against the force of the spring 66. The aforesaid actuator portion 69a is made up of, shape-memory alloy as the shape-memory material. Reference character 67c is an electrically conductive pivot pin of the drive lever 67 on the top of the shaft 68.

Reference character 70 is an intermediate portion fixed to the framework of the camera. Connected between this intermediate portion 70 and the drive lever 67 is the actuator portion 69a of the actuator 69 with both ends fixedly secured by electrically conductive screw fasteners 67d and 70a.

And this actuator portion 69a is connected through an overheat preventing device to be described later to an electrical power source circuit on current supply to generate heat. When its temperature rises above the transformation temperature (in this instance, referred to as $t_1$), it restores, for example, a coil-shaped memorized form from the illustrated or straight line-shaped state, causing a clockwise swing of the drive lever 67 as viewed in FIG. 11 which in turn causes the lens barrel 62 to move a predetermined distance. To this purpose, one end of the actuator portion 69a is electrically connected to a control circuit 74 through the drive lever 67, the pivot shaft 68 and a transistor 75. The other end of the actuator portion 69a is electrically connected to an electrical power source or battery 76 through the aforesaid overheat preventing device.

Next, the aforesaid overheat preventing device is described in more detail. In this embodiment, the device comprises an electrically conductive overheat preventing lever 71 rotatably mounted about a pivot pin 71d which is fixed to the framework of the camera, a spring 72 urging the overheat preventing lever 71 to cause a swingable electrode 71a to abut on a fixed electrode 73a of a terminal 73, and overheat preventing portions 69b and 69c made up of shape-memory alloy as the shape-memory material and connected between a screw 71b on the tail of the lever 71 and a screw 70a on the fixed intermediate portion 70. When not overheated, it is through this device that the actuator portion 69a is electrically connected to the terminal 73. The terminal 73 has its bottom 73b connected with a lead wire through which it is connected to the battery 76. The overheat preventing lever 71 fixedly carries a pin 71c to which one end of the spring 72 is connected.

A pulse code plate 81 is fixedly secured to the lens barrel 62. When the pulse code plate 81 moves relative to a photo-sensor 82 fixedly mounted on the framework of the camera, a control circuit 74 connected to the photo-sensor 82 receives information representing the distance by which the lens barrel 62 has moved.

The overheat preventing portions 69b and 69c having the above-described construction feature constitute the actuator 69 of this embodiment along with the actuator portion 69a. Because the overheat preventing portions 69b and 69c are formed by a parallel-connected circuit of two shape-memory alloy wires, each of which is of the same length and diameter as those of the actuator portion 69a, the electrical power flowing through is less than that flowing through the actuator portion 69a. Therefore, while the actuator portion 69a is heated to higher than the transformation temperature $t_1$ to deform, the temperature of the overheat preventing portions 69b and 69c do not yet rise above $t_1$. The overheat preventing portions 69b and 69c while maintaining the illustrated state allow for the actuator portion 69a on heating to deform (hence swing the drive lever 67) and, after cooling to return the lever 67 to the illustrated position by the spring 66.

Assuming that after the actuator portion 69a has been heated to higher than $t_1$, the current supply control circuit does not work for some reason, so that the current continues flowing so long as the overheat preventing portions 69b and 69c are heated to higher than $t_1$, then both portions 69b and 69c deform to restore the memorized shape, for example, a coil-like one. Therefore, the overheat preventing lever 71 is turned clockwise in FIG. 11 against the spring 72, whereby the electrode portion 71a is spaced apart from the terminal 73. Thus, the current supply circuit is broken to stop the current flow to the whole. Hence, the actuator portion 69a is no longer heated. In such a manner, the entirety of the actuator is prevented from being overheated.

Next explanation is given to the operation of the actuator of such construction.

Information representing the object distance detected by a distance measuring circuit (not shown) of the camera enters the control circuit 74. Based on this information, the transistor 75 turns on to start a current supply to the actuator portion 69a. In more detail, a current supply circuit: the battery 76→the terminal 73→the overheat preventing portion 71→the overheat preventing portions made of shape-memory alloy 69b and 69c→the screw fastener 70a→the actuator portion 69a→the screw fastener 67d→the drive lever 67→the shaft 68→a resistor→the transistor 75→the battery 76, is established. As the actuator portion 69a generates heat, when its temperature rises above the transformation temperature $t_1$, it deforms to a length of the previously memorized shape, it should be noted that up to this time, the overheat preventing portions 69b and 69c are not yet heated to the transformation temperature. This turns the drive lever 67 in the clockwise direction in FIG. 11. The swinging arm 67a of the drive lever 67 pushes the arm 62a of the lens barrel 62 in the direction of arrow B in FIG. 11, moving the lens barrel 62 against the spring 66 axially in the direction of arrow B in FIG. 11. Meanwhile, the movement of the lens barrel 62 is detected by the pulse code plate 81 and the photo-sensor 82. When the lens barrel 62 has moved up to a position that matches the information from the distance measuring circuit, the control circuit 74 changes over the transistor 75 to the non-conducting state. Because current longer flows in the circuit, the actuator portion 69a stops from generating heat. A shutter circuit (not shown) then operates to make an exposure. As the actuator portion 69a gradually cools down, when its temperature falls below a predetermined value (for example, 80° C.) depending on the used shape-memory alloy, it becomes so soft as to permit the lens barrel 62 to be moved in the direction of arrow A by the spring 66. By this movement of the lens barrel 62, the drive lever 67 is turned in the counterclockwise direction. By this movement of the drive, lever 67, the actuator portion 69a is expanded longitudinally, returning to the initial state.

Thus, the normal operation of the actuator of this example is completed.

When an accident happens that, for example, the photographer's finger presses the lens barrel 62, on the other hand, the focusing cannot be completed within a predetermined period for which the actuator portion 69a is heated. Since the pulse code plate 81 and the photo-sensor 82 cannot, for ever, detect when the lens barrel 62 has arrived the computed position, the control circuit 74 does not give the transistor 75 a signal representing the stoppage of current supply.

Therefore, the current in the heating circuit continues to flow to the actuator portion 69a. If the actuator were not provided with the overheat preventing device of the invention, the actuator portion 69a would be overheated. In some cases, it would melt down.

In this embodiment, however, the actuator is protected against such a damage, because it has the overheat preventing portions 69b and 69c composed of two wires of shape-memory alloy connected in series to the actuator portion 69a but in parallel to each other. In more detail, the failure of the normal movement of the lens barrel 62 results in abnormally prolonging the time of current flow to the actuator portion 69a. Hence, the two overheat preventing portions 69b and 69c of shape-memory alloy which are connected to the actuator portion 69a generate high heat. At a time when their temperature rises above the predetermined transformation temperature $t_1$, the overheat preventing portions 69b and 69c deform to the memorized shape.

Thereby, the overheat preventing lever 71 is turned with its electrode portion 71a disengaged from the terminal 73. As a result, the heating circuit is broken at that part. Thus, the current supply is cut off before the actuator portion 69a melts.

Figure 11:
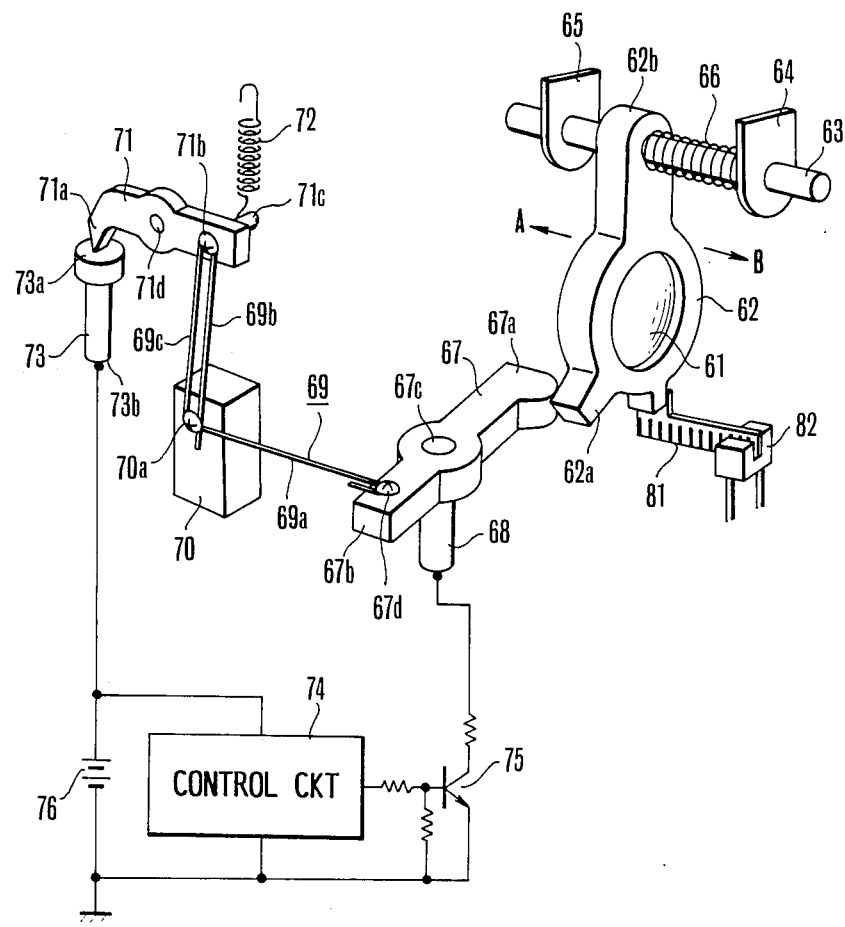
FIG. 11 is an exploded perspective view of still another embodiment of the invention in which the actuator is provided with means for preventing overheating.
Figure 12:
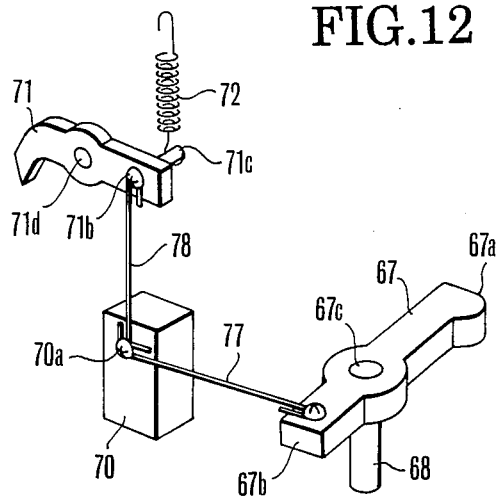
FIGS. 12 and 13 similar to FIG. 11 except that another two examples of the means are illustrated.
Figure 13:
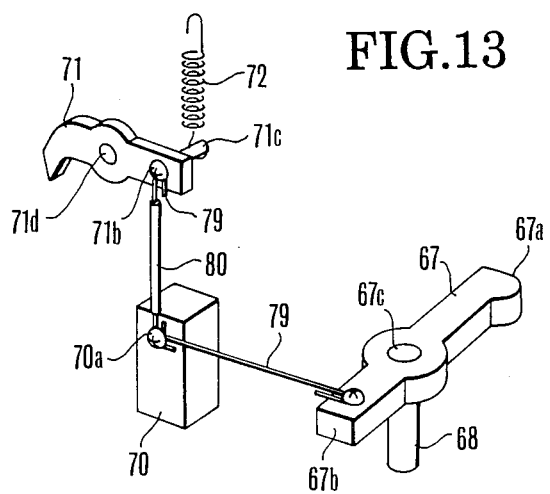

The above-described example of FIG. 11 is to use the shape-memory alloy of the same properties and same dimensions (length and diameter) in the illustrated relation for defining the aforesaid different timing of the operation. Yet, this may otherwise be effected by the arrangement and construction of the overheat preventing portions as shown in FIG. 12 or 13. In the examples shown in FIGS. 12 and 13, the other parts are similar to those shown in FIG. 11, and their explanation is omitted here.

In FIG. 12, an overheat preventing portion 78 is constructed by using a shape-memory alloy wire of larger diameter (or larger cross-sectional area) than that of the actuator portion 77 of the shape-memory alloy. Therefore, the overheat preventing portion 78 is smaller in specific resistance than the actuator portion 77, and, for the same current, generates a lesser amount of heat. Based on this, similarly to that described in connection with FIG. 11, the actuator portion 77 only generates motion if the AF operation is normal. If the actuator portion 77 is over-heated, the overheat preventing portion 78 actuates the lever 71.

In FIG. 13, a shape-memory alloy of the same properties and same dimensions as those of the actuator portion 79 is used in series connection to the latter, but clad with a radiating sleeve made of high heat conduction material, when an overheat preventing portion 80 is constructed. The required amount of current for heating the overheat preventing portion 80 to deform is made greater than that for the actuator portion 79. In this case, too, an equivalent effect to that of the above-described examples of the embodiment can be obtained.

It should be pointed out that in order to differentiate the timings of the operations of the actuator portion and the overheat preventing portion from each other, besides the use of different shape-memory alloys as suited to their functions, they may be constructed by using a common shape-memory alloy in the same form but in a different connection pattern to the electrical power source circuit, or with a radiating member or the like. Particularly in the latter case, because the ambient temperature influences almost equivalently the members of shape-memory alloy of the same properties, there is an advantage that compensation for change of the ambient temperature can be effected automatically.

As has been described above, according to the invention, in the embodiments thereof, on the premise that shape-memory alloy is used in an actuator, it is constructed as comprising an overheat preventing device using the same shape-memory alloy as that used in the actuator portion, but the timings of the operations of the device and actuator portions are differentiated from each other. Such a simple structure suffices for preventing the shape-memory alloy from being overheated causing it to melt, and its use provides a possibility of eliminating the disadvantage of laying many limitations on the conventional design resulting from the consideration of the environmental factors such as the ambient temperature. Hence, an actuator which enables the shape-memory alloy to bring its properties into full play can be advantageously realized.

Figure 14A:
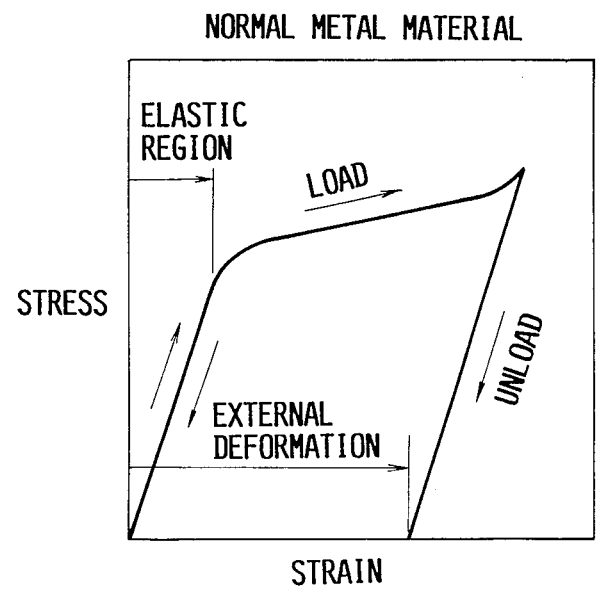
FIGS. 14(a), 14(b) and 14(c) are stress-strain diagrams for an ordinary metal, shape-memory alloy and superelastic alloy, respectively.
Figure 14B:
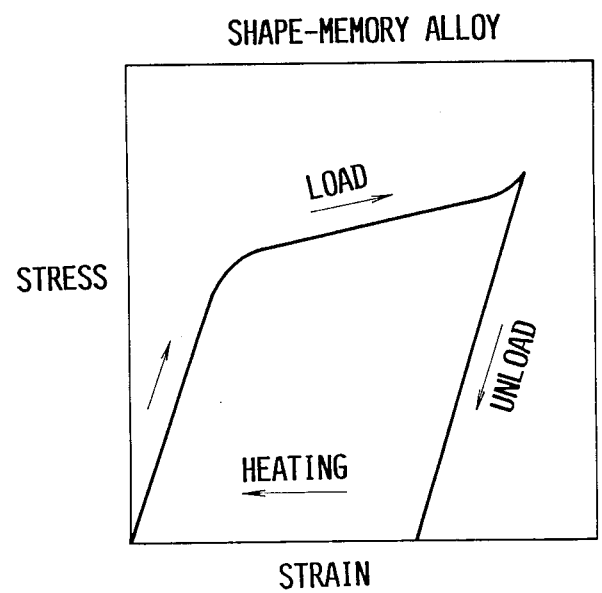
Figure 14C:
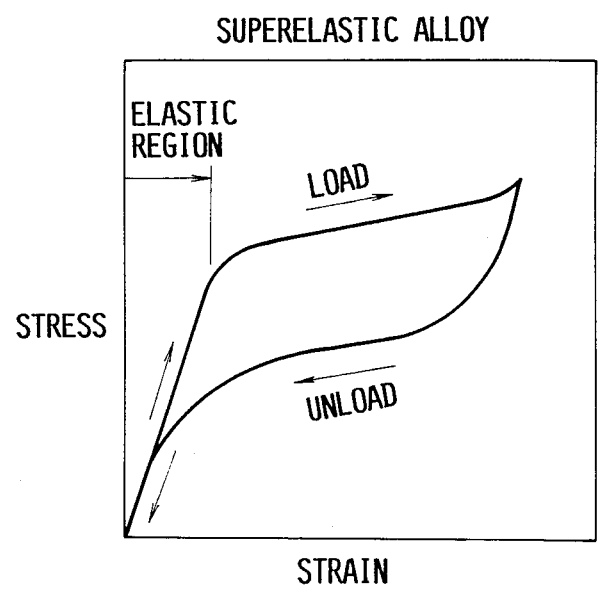

Here, the shape-memory alloy (mainly nickel-titanium alloy) mentioned in each of the above-described embodiments is exemplified with its physical, mechanical characteristics in Tables 1-a, 1-b and 1-c, and its stress-strain diagram in FIG. 14(b).

TABLE 1-a

| Physical Properties | |
|---|---|
| Density (g/cm$^3$) | 6.4–6.5 |
| Melting Point (°C.) | 1240–1310 |
| Specific Heat (cal/mol · °C.) | 6–8 |
| Coefficient of Linear Expansion (10$^{-6}$/°C.) | 10 |
| Thermal Conductivity (cal/cm · °C. · s) | 0.05 (R.T) |
| Specific Resistance (10$^{-6}$ ohm · cm) | 50–110* |

*Variable with Temperature.

TABLE 1-b

| Mechanical Properties | | |
|---|---|---|
| Tensile Strength (kg/mm$^2$) | (Heat Treated Material) | 70–110 |
| (kg/mm$^2$) | (Not Heat Treated Material) | 130–200 |
| Yield Strength Shape-Memory Alloy** | | |
| (kg/mm$^2$) | (Martensite Phase) | 5–20 |
| (kg/mm$^2$) | (Austenite Phase) | 10–60 |
| Superelastic Alloy*** | | |
| (kg/mm$^2$) | (Load On) | 10–60 |
| (kg/mm$^2$) | (Load Off) | 0–30 |
| Expansion (%) | 20–60**** | |

**Variable with the difference between the working temperature and the transformation point
***Variable with the working temperature
****Variable with the haat treatment condition TABLE 1-c

| Memory & Superelastic Characteristics | |
|---|---|
| Transformation Temperature (Af point) (°C.) | −10–100 |
| Hysteresis (Depending on Working condition) | 2–30 |
| Amount of Restored Shape | |
| (Low Frequency of repetition) | Not more than 6% |
| (High Frequency of Repetition) (N = 10$^5$) | Not more than 2% |
| (High Frequency of Repetition) (N = 10$^7$) | Not more than 0.5% |
| Restore Stress (Maximum) (kg/mm$^2$) | 30 |

It should be recognized that the shape-memory alloy usable in the invention is not limited to what is illustrated here. Other shape-memory alloys and further other shape-memory materials such as shape-memory plastics may be used as a matter of course.

Also, the invention is not confined to the focusing device and exposure device illustrated in all the above-described embodiments, but is applicable to other mechanisms of the camera and further other instruments than the cameras, provided that the shape-memory material is used.

What is claimed is:

1. A camera comprising:
   (A) motion means, rotatable in first and second directions, for effecting a sliding movement different from rotation when receiving rotative drive forces in said first and said second directions at the same time;
   (B) first shape-memory material for applying to said motion means the rotative drive force in said first direction;
   (C) a second shape-memory material for applying to said motion means the rotative drive force in said second direction;
   (D) first operating means, responsive to the rotation of said motion means by the drive force of said first or said second shape-memory material, for carrying out a first operation of the camera; and
   (E) second operating means, responsive to the sliding movement of said motion means by the drive forces of said first and said second shape-memory materials, for carrying out a second operation of the camera.

2. A camera according to claim 1, wherein said motion means moves in the direction of an optical axis of the camera by said sliding movement.

3. A camera according to claim 1, wherein said first and said second shape-memory materials are provided in unison.

4. A camera according to claim 1, wherein said first or said second shape-memory material includes a shape-memory alloy.

5. A camera according to claim 1, wherein said first operating means includes exposure means for carrying out an exposure operation.

6. A camera according to claim 1, wherein said second operating means includes focus adjusting means for carrying out a focusing operation.

7. A camera comprising:
   (A) operating means for operating the camera;
   (B) a shape-memory material for driving said operating means; and
   (C) cooling means for cooling said shape-memory material, said cooling means operating when phalosensitive material in the camera is transported.

8. A camera according to claim 7, wherein said cooling means includes a fan for cooling.

9. A camera according to claim 8, wherein said fan for cooling includes means for operating by a drive force for transportation of the photosensitive material.

10. A camera according to claim 7, wherein said cooling means includes means for operating by a driving force for transportation of the photosensitive material.

11. A camera according to claim 7, wherein said shape-memory material includes a shape-memory alloy.

12. A camera according to claim 7, wherein said operating means includes focus adjusting means for carrying out a focusing operation.

13. A camera comprising:
   (A) operating means for operating the camera;
   (B) a driving shape-memory material for driving said operating means, said driving shape memory material driving said operating means by restoring deformation; and
   (C) overheat preventing shape-memory material for preventing said driving shape-memory material from being overheated, said overheat preventing shape-memory material deforming to restore later than said driving shape-memory material and, when in deforming to restore, hindering the temperature of said driving shape-memory material from further rising.

14. A camera according to claim 13, wherein said driving shape-memory material and said overheat preventing shape-memory material are arranged, upon common current supply, to generate heat so that when said overheat preventing shape-memory material deforms to restore, the current supply to said driving shape-memory material is hindered.

15. A camera according to claim 14, wherein said driving shape-memory material and said overheat preventing shape-memory material are connected in series to each other.

16. A camera according to claim 15, wherein said overheat preventing shape-memory material is in the form of a plurality of members connected in parallel with one another.

17. A camera according to claim 15, wherein said overheat preventing shape-memory material has a larger cross-sectional area than said driving shape-memory material.

18. A camera according to claim 15, wherein said overheat preventing shape-memory material is provided with heat radiating means.

19. A camera according to claim 13, wherein said operating means includes focus adjusting means for carrying out a focusing operation.

20. A camera according to claim 13, wherein said driving shape-memory material or said overheat preventing shape-memory material includes a shape-memory alloy.

* * * * *

UNITED STATES PATENT AND TRADEMARK OFFICE
CERTIFICATE OF CORRECTION

PATENT NO. : 4,860,040
DATED : August 22, 1989
INVENTOR(S) : Hideo Tamamura, et al.

It is certified that error appears in the above-identified patent and that said Letters Patent is hereby corrected as shown below:

Title page:

[57] ABSTRACT

"made" should be deleted.

COLUMN 1:

Line 34, "phalographic" should read --photographic--.

Line 35, "improve" should read --overcome--.

COLUMN 2:

Line 49, "similar" should read --are similar--.
Line 7, "pholosensitive" should read --photosensitive--.

COLUMN 3:

Line 11, "non-con-" should be deleted.

Line 12, "tactly" should be deleted, and "contacting" should read --contacting,--.

Line 46, "the" (first occurrence) should be deleted.

COLUMN 4:

Line 13, "but" should be deleted.

Line 61, "on" should be deleted.

UNITED STATES PATENT AND TRADEMARK OFFICE
CERTIFICATE OF CORRECTION

PATENT NO. : 4,860,040

DATED : August 22, 1989

INVENTOR(S) : Hideo Tamamura, et al.

It is certified that error appears in the above-identified patent and that said Letters Patent is hereby corrected as shown below:

COLUMN 6:

Line 9, "further" should be deleted.

COLUMN 9:

Line 1, "through is" should read --through each of the overheat preventing portions 69b and 69c is--.

Line 42, "shape, it" should read --shape. It--.

Line 57, "longer" should read --no longer--.

Line 67, "drive, lever 67" should read --drive lever 67,--.

COLUMN 11:

Table 1-b, "haat" should read --heat--.

UNITED STATES PATENT AND TRADEMARK OFFICE
CERTIFICATE OF CORRECTION

PATENT NO. : 4,860,040
DATED : August 22, 1989
INVENTOR(S) : Hideo Tamamura, et al.

It is certified that error appears in the above-identified patent and that said Letters Patent is hereby corrected as shown below:

COLUMN 12:

Line 27, "first shape-memory material" should read --a first shape-memory material--.

Line 62, "phalo-" should read --photo---.

COLUMN 13:

Line 13, "driving shape memory" should read --driving shape-memory--.

Signed and Sealed this

Ninth Day of April, 1991

*Attest:*

HARRY F. MANBECK, JR.

*Attesting Officer*     *Commissioner of Patents and Trademarks*